US007886307B1

(12) United States Patent
Dean et al.

(10) Patent No.: US 7,886,307 B1
(45) Date of Patent: Feb. 8, 2011

(54) OBJECT-ORIENTED DATA TRANSFER SYSTEM FOR DATA SHARING

(75) Inventors: Loren Dean, Hopedale, MA (US); Robert DeSonia, Kihei, HI (US); John Holohan, Newton Centre, MA (US); Christian Portal, Holliston, MA (US); Dave Tarkowski, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 1154 days.

(21) Appl. No.: 10/671,703

(22) Filed: Sep. 26, 2003

(51) Int. Cl.
G06F 3/00 (2006.01)
G06F 9/44 (2006.01)
G06F 9/46 (2006.01)
G06F 13/00 (2006.01)

(52) U.S. Cl. ..................................... 719/316

(58) Field of Classification Search ......... 719/312–315, 719/331–332, 316; 709/213–219, 230–244, 709/246–247; 710/1–74; 712/225; 715/700, 715/748, 769
See application file for complete search history.

(56) References Cited

U.S. PATENT DOCUMENTS

| 5,437,027 | A | * | 7/1995 | Bannon et al. .......... 707/103 R |
| 5,692,157 | A | * | 11/1997 | Williams .................... 709/246 |
| 5,881,230 | A | * | 3/1999 | Christensen et al. ........ 709/203 |
| 5,911,066 | A | * | 6/1999 | Williams et al. ............ 719/310 |
| 5,913,032 | A | * | 6/1999 | Schwartz et al. ............ 709/213 |
| 5,986,667 | A | * | 11/1999 | Jevans ........................ 345/619 |
| 6,078,924 | A | * | 6/2000 | Ainsbury et al. ............ 707/101 |
| 6,134,583 | A | * | 10/2000 | Herriot ....................... 709/217 |
| 6,230,213 | B1 | * | 5/2001 | Davidson .................... 719/316 |
| 6,256,625 | B1 | | 7/2001 | Breyer et al. |
| 6,438,616 | B1 | * | 8/2002 | Callsen et al. .............. 719/316 |
| 6,593,947 | B1 | * | 7/2003 | Ashe et al. .................. 715/810 |
| 6,598,094 | B1 | * | 7/2003 | Wollrath et al. ............. 719/330 |
| 6,721,951 | B1 | * | 4/2004 | Williams et al. ............ 719/329 |
| 6,748,450 | B1 | * | 6/2004 | Dutta .......................... 709/246 |
| 6,766,350 | B1 | * | 7/2004 | Moreau ....................... 709/200 |
| 6,823,524 | B1 | * | 11/2004 | Hewett ........................ 719/318 |

(Continued)

OTHER PUBLICATIONS

Robert Powell and Richard Weeks, "C# and the .Net Framework: The C++ Perspective", Sep. 26, 2001, Chapter 2.1., p. 1.*

*Primary Examiner*—Hyung S Sough
*Assistant Examiner*—KimbleAnn Verdi
(74) *Attorney, Agent, or Firm*—Nelson Mullins Riley & Scarborough LLP; Kevin J. Canning; Neslihan I. Doran

(57) ABSTRACT

A method transfers data from a data source to multiple data sink objects. The data acquired from the data source is encapsulated into a data object. Identification information of the data object is posted to a data server. The data server shares the identification information with the data sink objects that are registered with the data server. The data sink objects access the data object with the identification information at execution time. A counter indicates the number of data sink objects that currently use the data object. The data object is removed from the memory of the computer systems when the counter indicates that the data object is no longer used by the data sink objects. Alternatively, the data object that is no longer used may be stored in a separate memory location of the computer systems for a future use.

23 Claims, 10 Drawing Sheets

U.S. PATENT DOCUMENTS

| | | | |
|---|---|---|---|
| 6,894,802 B1 * | 5/2005 | Biondi et al. | 358/1.16 |
| 7,036,127 B2 * | 4/2006 | Cheng et al. | 719/315 |
| 7,062,771 B2 * | 6/2006 | Wall et al. | 719/316 |
| 7,216,091 B1 * | 5/2007 | Blandina et al. | 705/26 |
| 7,296,042 B2 * | 11/2007 | Edwards et al. | 707/205 |
| 7,523,191 B1 * | 4/2009 | Thomas et al. | 709/224 |
| 2002/0078060 A1 * | 6/2002 | Garst et al. | 707/100 |
| 2002/0178298 A1 * | 11/2002 | Callsen et al. | 709/316 |
| 2003/0041163 A1 * | 2/2003 | Rhoades et al. | 709/232 |
| 2003/0088536 A1 * | 5/2003 | Behnia | 707/1 |
| 2003/0196063 A1 * | 10/2003 | Garst et al. | 711/170 |
| 2003/0208537 A1 * | 11/2003 | Lane et al. | 709/204 |
| 2005/0076343 A1 * | 4/2005 | Kammhuber | 719/316 |

* cited by examiner

OBJECT-ORIENTED DATA TRANSFER SYSTEM FOR DATA SHARING

FIELD OF THE INVENTION

The present invention relates generally to data transfer systems and more particularly to object-oriented data transfer methods and systems for transferring data from a data source to multiple data sink objects.

BACKGROUND OF THE INVENTION

In computer systems, some application software tools enable computer users to analyze or process the data acquired from data acquisition devices, such as cameras and scanners. The application software tools may also enable the computer users to send the analyzed or processed data to output devices coupled to the computer systems, so that the computer users can obtain the analyzed or processed data. MATLAB, from The MathWorks, Inc. of Natick, Mass., is one of the application software tools that provides an integrated mathematical computing and visualization environment for technical computing. The computer systems, which run the application software tools, such as MATLAB, need data transfer systems for transferring the data acquired from the data acquisition devices to the application software tools that analyze and process the data. The computer systems may also need data transfer systems that transfer the analyzed or processed data to the output devices or other application software tools. Image Acquisition Toolbox, from The MathWorks, Inc. of Natick, Mass., provides a set of software tools for acquiring data from data acquisition devices and transferring the data to application software tools or output devices.

In conventional data transfer systems, extraneous copies of data are made to transfer the data to each of the application software tools or output devices. The extraneous copies of the data make it impractical, and in some cases impossible, for users to allocate sufficient memory space in computer systems to contain all of the copies of the data. Furthermore, the conventional data transfer systems store the data that is no longer used by the application software tools or output devices in the memory of the computer systems, which results in the reduction of the memory space available in the computer systems. Therefore, there is a need for data transfer systems in which the data acquired from data acquisition devices is transferred to each of the application software tools or output devices without making extraneous copies of the data. That is, the data acquired from the data acquisition devices needs to be shared by the application software tools or output devices. There is also a need for data transfer systems in which the data that is no longer used by the application software tools or output devices is removed from the memory in the computer systems.

SUMMARY OF THE INVENTION

The present invention provides methods and systems for transferring data from a data source to multiple data sink objects in computer systems. The present invention provides object-oriented data transfer methods and systems in which the data acquired from the data source is encapsulated into a data object. The data object is shared by the multiple data sink objects which manipulate, display, analyze or process the data associated with the data object. The data object shared by the multiple data sink objects prevents extraneous copies of the data being transferred and thereby enhancing the memory space available in the computer systems. The present invention also provides object-oriented data transfer methods and systems in which a data object is automatically removed from the memory of computer systems when the data object is no longer used by data sink objects. The present invention provides a counter for the data object that contains information on whether the data object is used by the data sink objects. The data object is removed from the memory when the information of the counter indicates that the data object is no longer used by the data sink objects. Alternatively, the data object that is no longer used by the data sink objects may be stored in a separate memory location of the computer systems for a future use.

In an illustrative embodiment of the present invention, a method is provided for transferring data from a data source to multiple data sink objects. The data is received from the data source and encapsulated into a data object in the memory of a computer system. The information identifying the data object is provided to the multiple data sink objects. The multiple data sink objects access the data associated with the data object using the identification information.

In another illustrative embodiment of the present invention, a data transfer system is provided for transferring data from a data source to multiple data sink objects in a computer. The system includes an interface for communicating with the data source to receive the data from the data source. The system also includes a data processor for encapsulating the data into a data object in the memory of a computer system. The data transfer system further includes a data server for providing to the multiple data sink objects identification information identifying the data object. The multiple data sink objects access the data encapsulated into the data object using the identification information.

In still another illustrative embodiment of the present invention, computer readable medium is provided for holding computer-executable instructions for a method in a computer system that receives data from a data source and transfers the data to data sink objects. The instructions communicate with the data source to receive the data from the data source and encapsulate the data into a data object in the memory of the computer system. The instructions include a data server object that provides the data sink objects with the information identifying the data object. The data sink objects access the data object using the identification information.

By encapsulating data acquired from a data source into a data object and sharing the data object, the data transfer system of the present invention can prevent extraneous copies of the data provided to each of the data sink objects. Furthermore, the data transfer systems of the present invention remove from the memory of computer systems the data object that is no longer used by the data sink objects. As a result, the present invention enhances the efficiency of the memory usage in the computer systems.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

The illustrative embodiment of the present invention concerns object-oriented data transfer systems for transferring data from a data source coupled to a computer system to a data sink object of application software tools in the computer systems. Although the illustrative embodiment of the present invention describes the data transfer system for transferring data from the device coupled to the computer systems to the application software tools, the present invention can apply to any data transfer systems including a data transfer system for transferring data from application software tools to devices coupled to the computer system, and a data transfer system for transferring data between application software tools.

The illustrative embodiment of present invention encapsulates the data acquired from a data source into a data object. The information identifying the data object is provided to multiple data sink objects that express interest in the data acquired from the data source. Data sink objects can access the data object with the identification information. The data object is shared by the multiple data sink objects which need the data to perform the functions of the data sink objects. The illustrative embodiment of present invention provides a counter for the data object that contains information on how many data sink objects are currently using the data object. The data object is removed from the memory of computer systems when the counter indicates that the data object is no longer used by the data sink objects. Alternatively, the data object that is no longer used by the data sink objects may be stored in a separate memory location of the computer systems for a future use.

Figure 1:
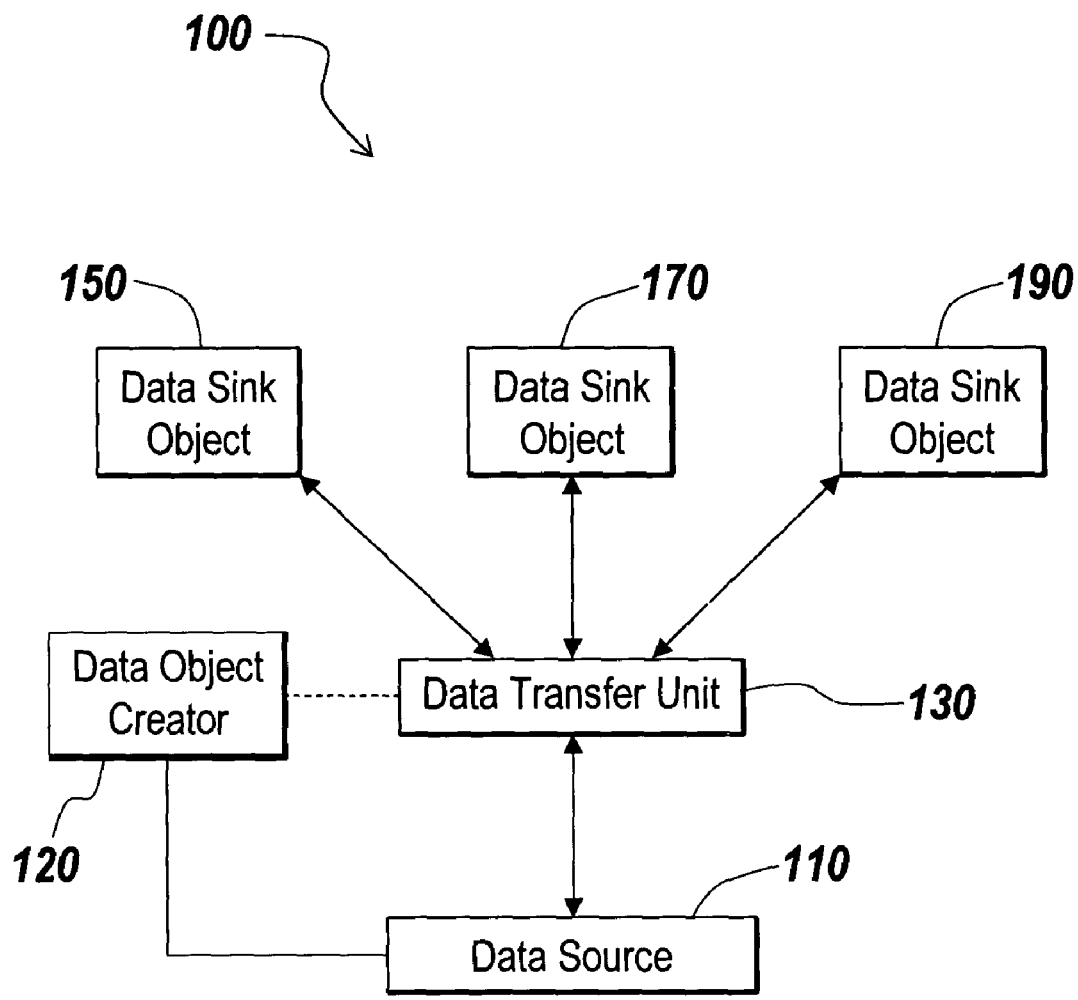
FIG. 1 is a block diagram representation of a data transfer system located between a data source and multiple data sink objects in the illustrative embodiment of the present invention.

FIG. 1 is a block diagram representation of a data transfer system 100 in the illustrative embodiment of the present invention. The data transfer system 100 includes a data source 110, data sink objects 150-190, a data object creator 120 and a data transfer unit 130 located between the data source 110 and the data sink objects 150-190. The data transfer unit 130 can be implemented separately from the data source 110 and the data sink objects 150-190, or in combination with the data sink objects 150-190. One of skill in the art will appreciate that the data transfer unit 130 can be implemented in combination with the data source and/or data sink in other embodiments of the present invention.

The data source 110 is one of the terminals in the data transfer system 100. The data source 110 may include data acquisition systems, such as cameras, scanners, radars, etc. One of skill in the art will appreciate that the data source 110 is not limited to the data acquisition systems and rather includes any systems that originate data. For example, data sources may include network data sources including Internet data sources. In other embodiment of the present invention, such as in the data transfer system for transferring data from an application software tool in a computer system, the application software tool may be a data source. The data acquired from the data source 110 includes a single data or a sequence of data. The data may be a large sequence of textual or binary data, such as image data, continuously provided for a period of time. The data may also be packaged in logical datasets, such as frames of image data, video streams and scans of radar data, each of which can be utilized independently of other datasets. One of skill in the art will appreciate that the data acquired from the data source 110 is not limited to the format mentioned above and rather includes any other format of data. One of skill in the art will also appreciate that the data acquired from the data source 110 is not limited to the image data and rather includes any other data, such as financial data and multimedia data.

The data sink objects 150-190 are the other terminal of the data transfer system 100. The data sink objects 150-190 receive data from the data source 110 through the data transfer unit 130. The data sink objects 150-190 are application software tools that manipulate, visualize, process or analyze the data. The data sink objects 150-190 may receive and operate on the data at different streaming rates. One of skill in the art will appreciate that the data sink is not limited to application software tools and rather includes any systems that receive data in the data transfer system 100. In other embodiments of the present invention, such as a data transfer system for transferring data to devices coupled to the computer, the devices coupled to the computer can be data sink objects.

The data source 110 invokes the methods of the data object creator 120 that creates and destructs various types of data object. After the data source 110 encapsulates the data into a data object, the data transfer unit 130 receives information identifying the data object from the data source 110. The data transfer unit 130 provides to the data sink objects 150-190 the information identifying the data object. The sink objects 150-190 access and share the data object using the identification information. One of skill in the art will appreciate that in an alternative embodiment of the present invention, the data transfer unit 130 may receive the data from the data source 110 and invoke the methods of the data object creator 120 to encapsulate the data received from the data source 110 into a data object.

The data object is provided with a counter that contains information on whether the data object is used by the data sink objects 150-190 and how many data sink objects 150-190 use the data object. The data transfer unit 130 automatically removes the data object from the memory of a computer system when the counter indicates that the data object is no longer used by the data sink objects 150-190. Alternatively, the data object that is no longer used by the data sink objects 150-190 may be stored in a separate memory location of the computer system for a future use.

Figure 2:
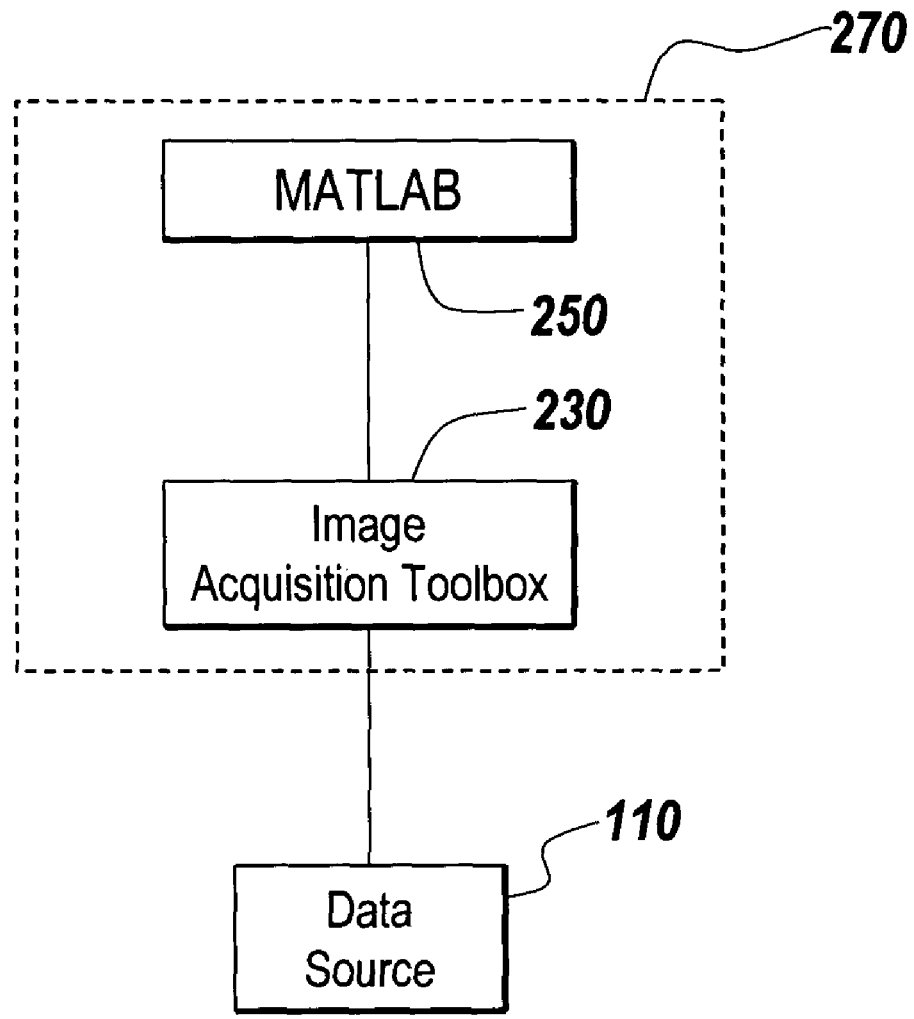
FIG. 2 is a block diagram representation of exemplary software tools implementing the illustrative embodiment of the present invention depicted in FIG. 1.

FIG. 2 is a block diagram representation of exemplary software tools 270 implementing the data transfer system 100 in the illustrative embodiment of the present invention depicted in FIG. 1. The software tools 270 include MATLAB 250 and Image Acquisition Toolbox 230, both from The MathWorks, Inc. of Natick, Mass. MATLAB 250 includes a technical computing environment that provides core mathematics and advanced graphical tools for data analysis, visualization, and algorithm and application development. The computing environment in MATLAB 250 provides the mathematical, statistical, and engineering functions to satisfy engineers' and scientists' technical computing needs.

The Image Acquisition Toolbox 230 is based on the MATLAB 250 environment, which provides a single, integrated environment to support the data acquisition from a data source 110 and the analysis of the data acquired from the data source 110. The software tools 270 are seamlessly combined to receive data from the data source 110, and to analyze, process, and visualize the data, and save the data for post-processing. The Image Acquisition Toolbox 230 provides a set of tools for acquiring data from the data source 110. The Image Acquisition Toolbox 230 also provides a set of M-file and MEX-file functions for controlling the data acquired from the data source 110. For example, the Image Acquisition Toolbox 230 provides functions that enable users to preview the acquired data, and perform the analysis of the data on the fly. Image Acquisition Toolbox 230 also provides functions that logs data to disk, memory, or both. The Image Acquisition Toolbox 230 streams data into the MATLAB 250 for further analysis and visualization of the data.

One of skill in the art will appreciate that although the illustrative embodiment is implemented in computing environments, such as MATLAB 250, the present invention may be implemented in modeling and simulation environments including graphical environments, such as block diagram environments, and textual command line environments. The block diagram environments may include the environment provided by Simulink from The MathWorks, Inc. of Natick, Mass. One of skill in the art will also appreciate that the present invention may be implemented in real time environments, such as Real Time Workshop from The MathWorks, Inc. of Natick, Mass.

Figure 3:
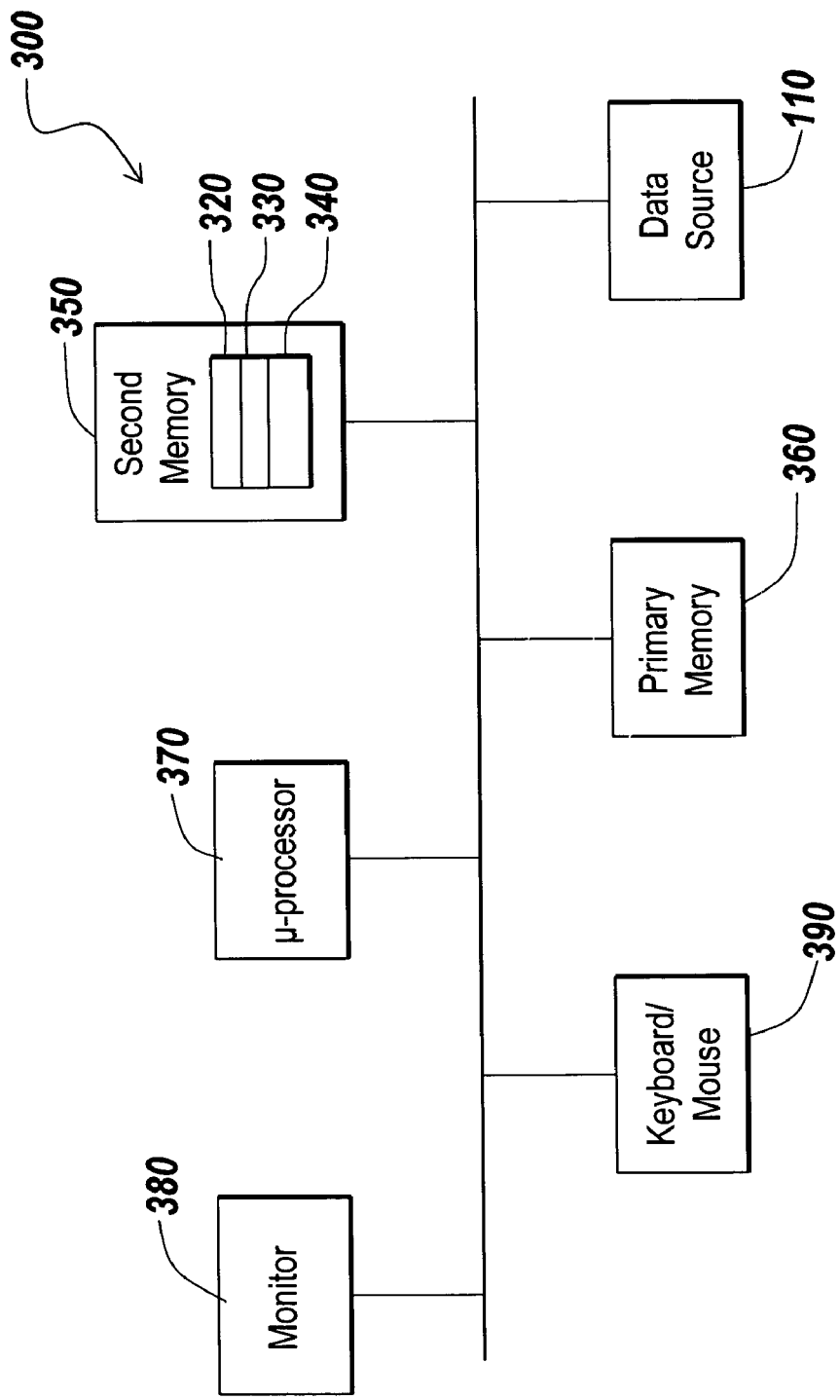
FIG. 3 is a block diagram of an exemplary computer system suitable for practicing the illustrative embodiment of the present invention.

FIG. 3 is a block diagram of an exemplary computer system 300 suitable for practicing the illustrative embodiment of the present invention depicted in FIG. 1. The computer system 300 includes a data source 110, a secondary memory 350, a primary memory 360, a µ-processor 370, a monitor 380 and a keyboard/mouse 390. The µ-processor 370 controls each component of the computer system 300 to run the software tools for object-oriented data transfer system properly. The computer system 300 receives through the keyboard/mouse 390 the control data necessary for transferring data from the data source 110, such as the control data for creating a data object. The computer system 300 may display in the monitor 380 the acquired data for users to preview the data. The monitor 380 may also display the result of the analysis and process of the data. The primary memory 360 fetches from the secondary memory 350 and provides to the µ-processor 370 the codes that need to be accessed quickly by the µ-processor 370 to operate the computer system 300 and to run the software tools for transferring the data. The secondary memory 350 usually contains the application software tools. The secondary memory 350 includes, in particular, codes 320 for the data transfer unit 130, and codes 330 for the data sink objects 150-190. The secondary memory 350 also includes codes 340 for the data object encapsulating the data acquired from the data source 110. The computer system 300 may include network interfaces for communicating with other electronic devices through communication networks, such as Internet, intranet, LAN (Local Area Network), WAN (Wide Area Network) and MAN (Metropolitan Area Network). The communication interfaces may enable the computer system 300 to acquire data from data sources connected through communication networks.

Figure 4:
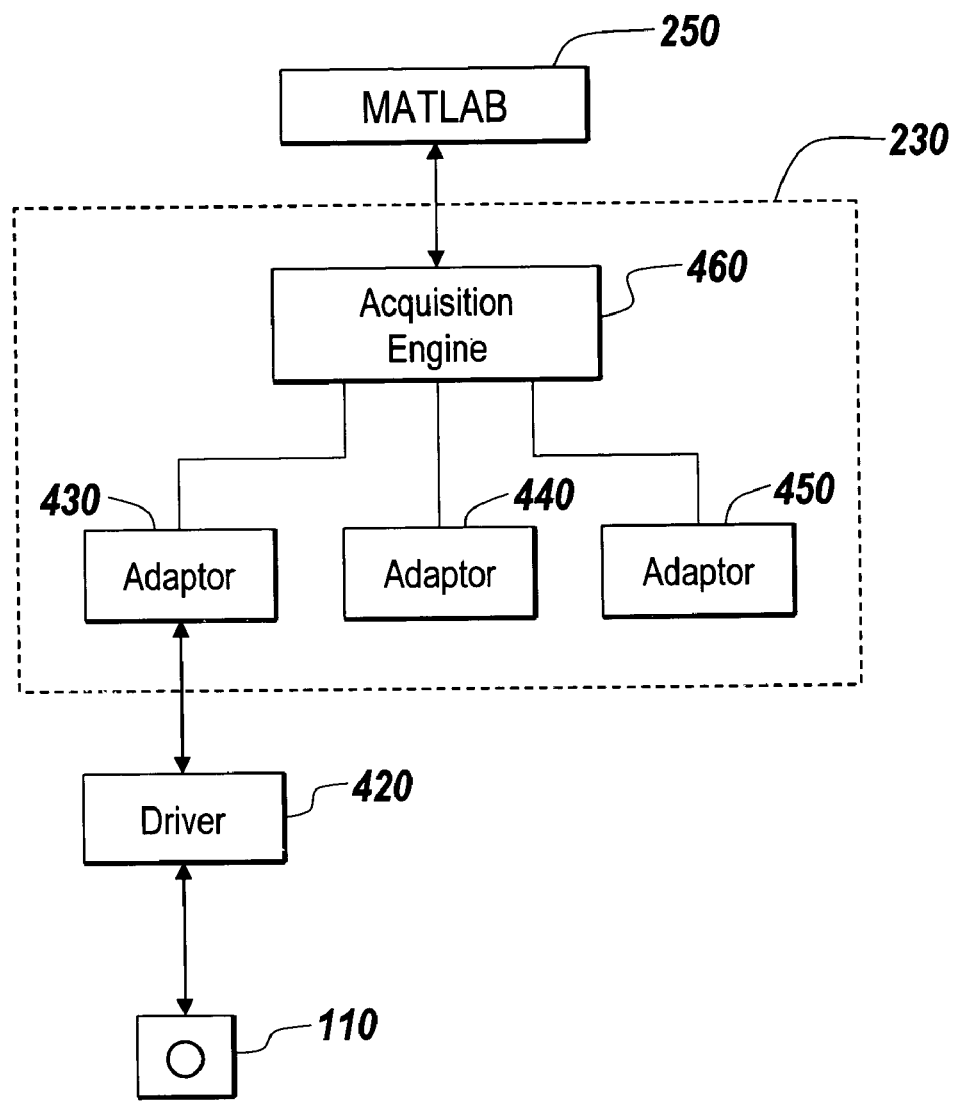
FIG. 4 is a block diagram representation illustrating in more detail the software tools depicted in FIG. 2.

FIG. 4 is a block diagram representation illustrating in more detail the application software tools implementing the data transfer system 100 in the illustrative embodiment of the present invention depicted in FIG. 1. The Image Acquisition Toolbox 230 provides a path for transferring data from a data source 110 to MATLAB 250. The Image Acquisition Toolbox 230 is interfaced with the data source 110 via the driver 420 of the data source 110. The driver 420 is of various types depending on the hardware of the data source 110 and is provided by the vendor of the data source 110 for the operation of the data source 110 by users.

The Image Acquisition Toolbox 230 contains subcomponents including an acquisition engine 460 and adaptors 430-450. The acquisition engine 460 controls all of the logic for acquiring data from the data source 110, and storing and sending the acquired data to the MATLAB 250. While the acquisition engine 460 performs its own tasks, MATLAB 250 can also perform other tasks such as analyzing the acquired data. In other words, the acquisition engine 460 and MATLAB 250 operate asynchronously. The adaptors 430-450 are components for communicating with a data source 110 via the driver 420 of the data source 110. The adaptors 430-450 adapt the hardware driver 420 of the data source 110 to the Image Acquisition Toolbox 230. The adaptors 430-450 support specific vendors of the data source 110. For example, an adaptor 430 supports for the data source devices produced by Data Translation, Inc. of Marlboro, Mass., and an adaptor 440 for the data source devices produced by Matrox Electronic Systems, Ltd. of Québec, Canada. In addition, the adaptor 450 may support devices that provide a WDM (Windows Driver Model) or VFW (Video for Windows) driver including USB and FireWire (IEEE-1394) cameras, as well as DCAM (IEEE-1394 Digital Camera specification) compliant devices such as scientific cameras. The Image Acquisition Toolbox 230 will be described below in more detail with reference to FIG. 5.

The application software tools may be implemented in C programming language or object-oriented programming languages, such as C++, C# and Java, to realize the illustrative embodiment of the present invention. The object-oriented programming languages express a program as a set of objects, which communicate with each other to perform tasks. The objects are entities of a program that have properties and methods. The properties of an object are the data associated with the object and determine the attributes of the object. The methods of an object are operations (or functions) that the object can perform. One of skill in the art will appreciate that the software tools can be programmed using other programming languages, such as M-code, C-code and FORTRAN. The software tools written in C++, for example, can be compiled using the MEX command in MATLAB to make a file that is executable in the MATLAB environment. Alternatively, another embodiment of the present invention may provide a software tool written in C programming language or an object-oriented programming language, such as C++, C# and Java, that can be executed outside of MATLAB. The application software may also be incorporated into a deployable application by using a compiler for compiling the software application.

Figure 5:
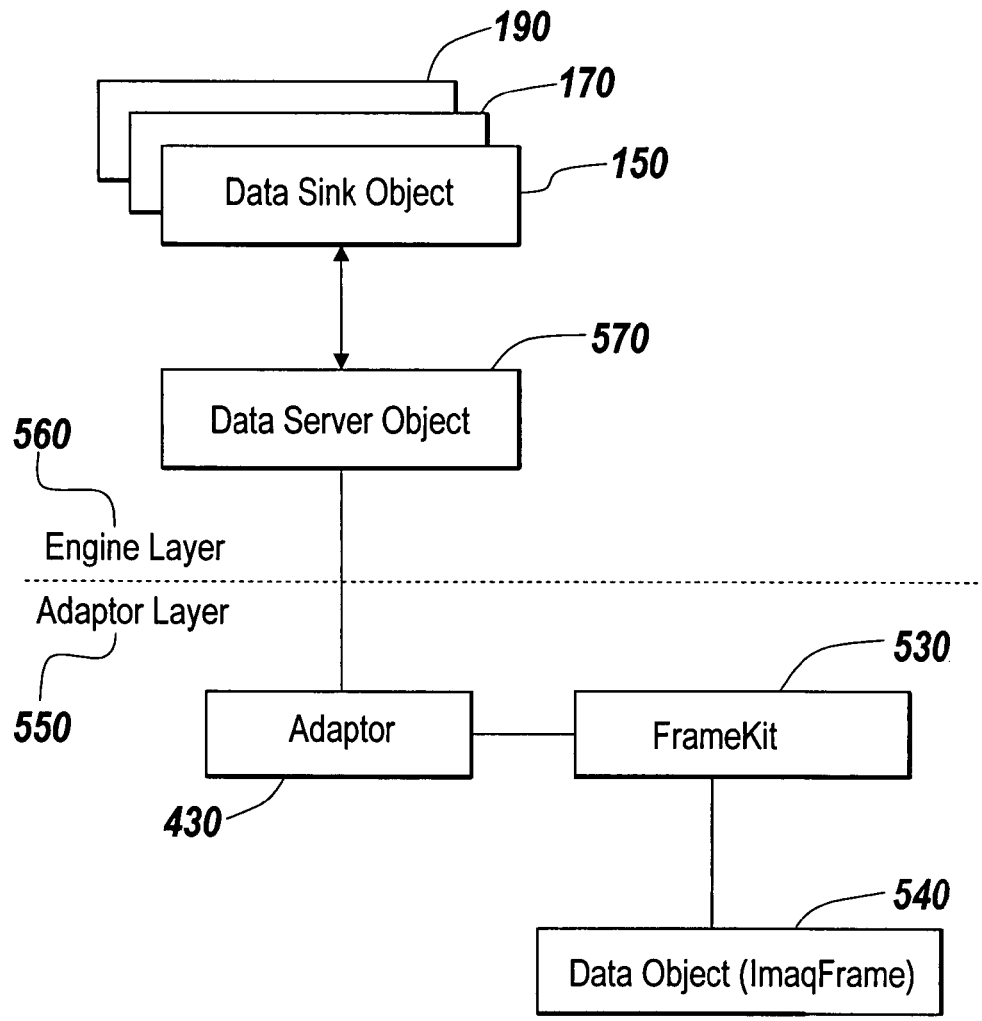
FIG. 5 is a block diagram representation illustrating in more detail the software tools depicted in FIG. 4.

FIG. 5 is a block diagram representation illustrating in more detail the Image Acquisition Toolbox 230 in the illustrative embodiment of the present invention depicted in FIG. 4. The Image Acquisition Toolbox 230 is divided into two layers including an adaptor layer 550 and an engine layer 560.

The adaptor layer 550 includes an adaptor 430, a frame kit 530 and a data object (ImaqFrame) 540. The adaptor. 430 receives data from the data source 110 through is driver 420. The adaptor layer 550 provides a frame kit 530 that includes a library of functions for creating and managing the data object 540. The functions in the frame kit 530 are called by the adaptor 430 to create the data object 540 into which the data received from the data source 110 is encapsulated. Additional metadata, such as time stamp, memory information and index in a sequence, may be stored in the data object 540, which can be made accessible to users and data sink objects 150-190 for display, processing, memory logging, file logging, etc. When the data received from the data source 110 is encapsulated into the data object 540, memory for the data object 540 is automatically allocated by the frame kit 530. The memory is also de-allocated or reused automatically by the frame kit 530 when the data object 540 is no longer used by data sink objects. Moreover, a maximum amount of memory may be configured for use by all data objects at a given instance in time.

The data object 540 is an instance of a data object class. The data object class defines properties of the data objects that are its instances, and methods for creating and manipulating the instances. The properties of the data object 540 include the size, dimension (e.g., width, height, and number of bands in each image frame), color space (YUV, RGB, etc.), data type (Unsigned Int 8, Unit 16, etc.) of the data object 540. The data sink objects 150-190 may use the properties of the data object 540 to manipulate the data associated with the data object 540. The properties of the data object 540 also include a counter that is described below in more detail with reference to FIG. 9. One of skill in the art will appreciate that the data object can be extended to encapsulate any textual or binary data by inheriting from a data object class.

Figure 7:
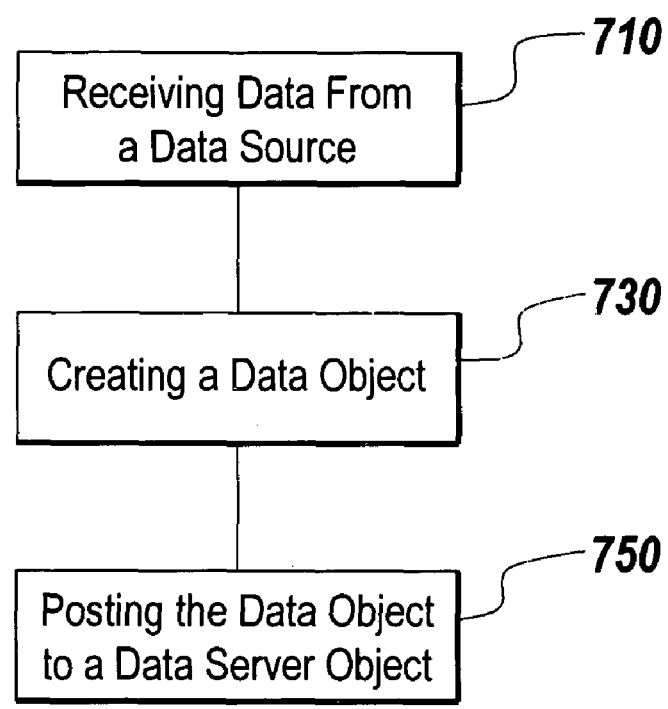
FIG. 7 is a flow chart summarizing the exemplary operation of the adaptor layer in the illustrative embodiment of the present invention.

Once the adaptor 430 calls the functions in the frame kit 530 to create the data object 540, the functions return identification information of the data object 540, such as a pointer of the data object 540. The pointer of the data object 540 indicates the location of the data object 540 in the memory of the computer systems. By using the pointer of the data object 540, the memory for the data object 540 can be dynamically allocated and deallocated. FIG. 7 is the flow chart summarizing an exemplary operation of the adaptor layer 550 in the illustrative embodiment of the present invention. First, data is received from the data source 110 (step 710) and encapsulated into a data object 540 (step 730). The data object 540 is posted to the data server object 570 with the information identifying the data object 540 (step 750).

The engine layer 560 of the Image Acquisition Toolbox 230 includes a data server object 570 and data sink objects 150-190. The data server object 570 is responsible for transferring the data object 540 that is posted to the data server object 570. The data server object 570 has a list of data sink objects 150-190 that are registered with the data server object 570. The data sink objects 150-190 that have interests in the data object 540 are registered with the data server object 570 to receive the identification information of the data object 540. The data server object 570 shares the identification information of the data object 540 with any number of data sink objects 150-190 that are registered with the data server object 570. The data object 540 is shared by the data sink objects 150-190 to avoid making extraneous copies of the data object 540 being transferred.

The data sink objects 150-190 are consumers of the data object 540. The data sink objects 150-190 may be provided in the Image Acquisition Toolbox 230 or MATLAB 250. The tasks of the data sink objects 150-190 are application specific. For example, the data sink object 150 may enable users to preview the acquired data. Previewing the acquired data can be helpful to make sure that the data being acquired is satisfactory. For example, by looking at the preview window of the acquired data, users can verify that the lighting and focus of the data are correct. The data sink object 170 may store an indeterminate number of data objects in a container, for an indeterminate amount of time (i.e. data buffering), or until users choose to retrieve the data. The data sink object 190 may access the data associated with the data object 540 in order to analyze the data or log the data to a file. Each of the data sink objects 150-190 dynamically determines how to process the data object 540 at execution time. The data sink objects 150-190 may perform their functions either on the thread of the data server object 570 or on a separate thread.

Figure 6:
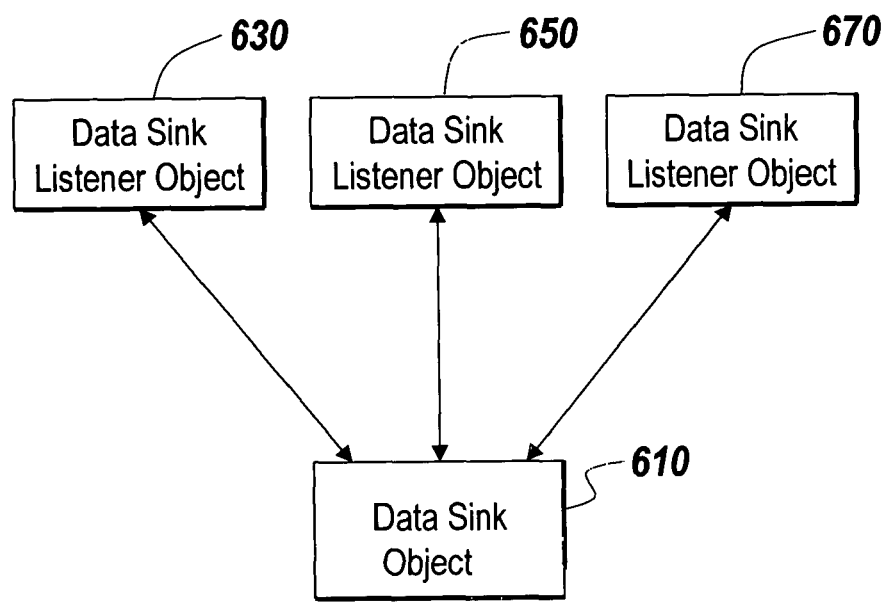
FIG. 6 is a block diagram representation of at least one data sink listener coupled to a data sink in the illustrative embodiment of the present invention.

In the engine layer 560, data sink listener objects can be created and registered with a data sink object. FIG. 6 is a block diagram representation of data sink listener objects 630-670 and a data sink object 610 in the illustrative embodiment of the present invention. The data sink listener objects 630-670 perform functions relating to the task performed by the data sink object 610. For example, if the data sink object 610 displays the preview window of the acquired data, the data sink listener objects 630-670 may display the absolute or relative acquisition time when the data is acquired. The data sink object 610 notifies the data sink listener objects 630-670 when the state of the data sink object 610 changes to be active or inactive. The data sink object 610 also notifies the data sink listener objects 630-650 when the data sink object 610 is updated with a new data object. If the data sink object 610 is deleted, the data sink listener objects 630-650 registered with the data sink object 610 are automatically removed.

Figure 8:
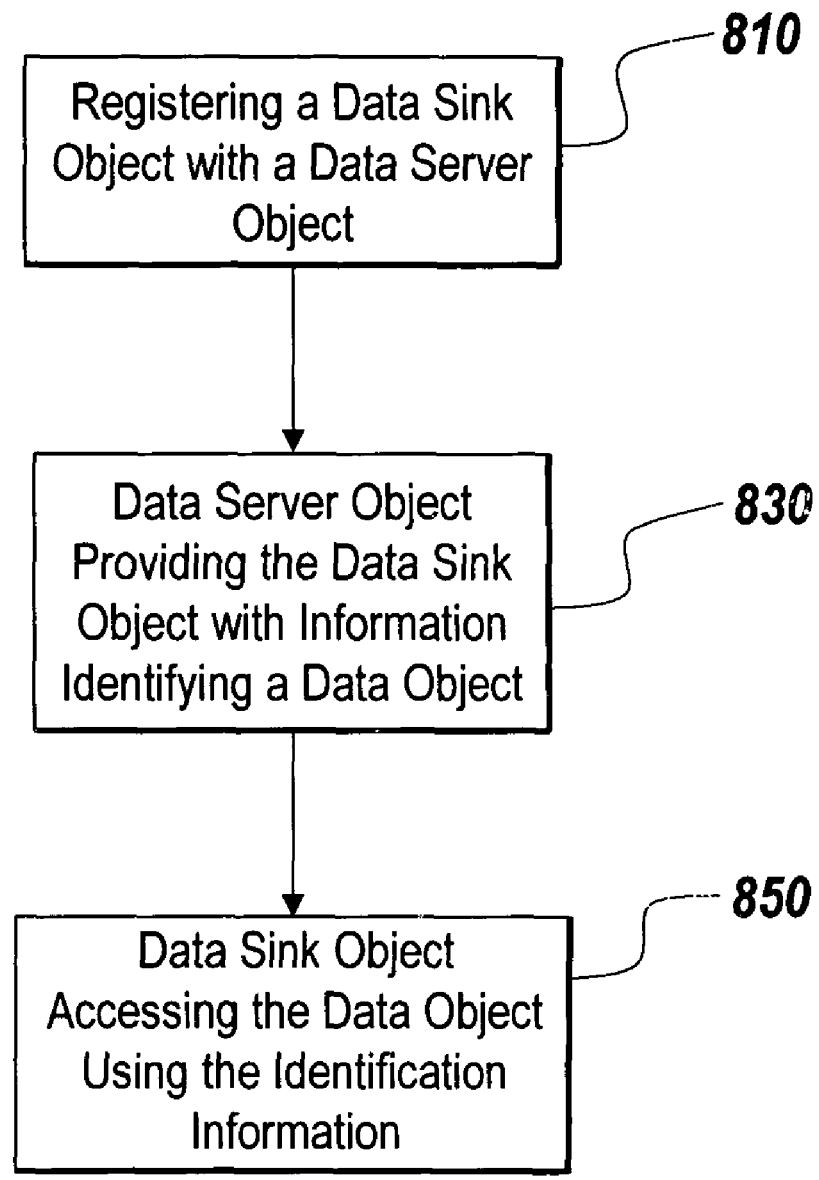
FIG. 8 is a flow chart showing the exemplary operation of the engine layer in the illustrative embodiment of the present invention.

FIG. 8 is the flow chart showing the operation of the engine layer 560 in the illustrative embodiment of the present invention. The data sink object 150 is registered with the data server object 570 to receive the pointer information of the data object 540 (step 810). The data server object 570 shares the pointer information of the data object 540 with the data sink objects 150-190 that are registered with the data server object 570 (step 830). The data sink objects 150-190 can subsequently access the data object 540 with the pointer information of the data object 540 at execution time (step 850). Consequently, the data object 540 is shared by the multiple data sink objects 150-190, which prevents extraneous copies of the data being transferred.

Figure 9:
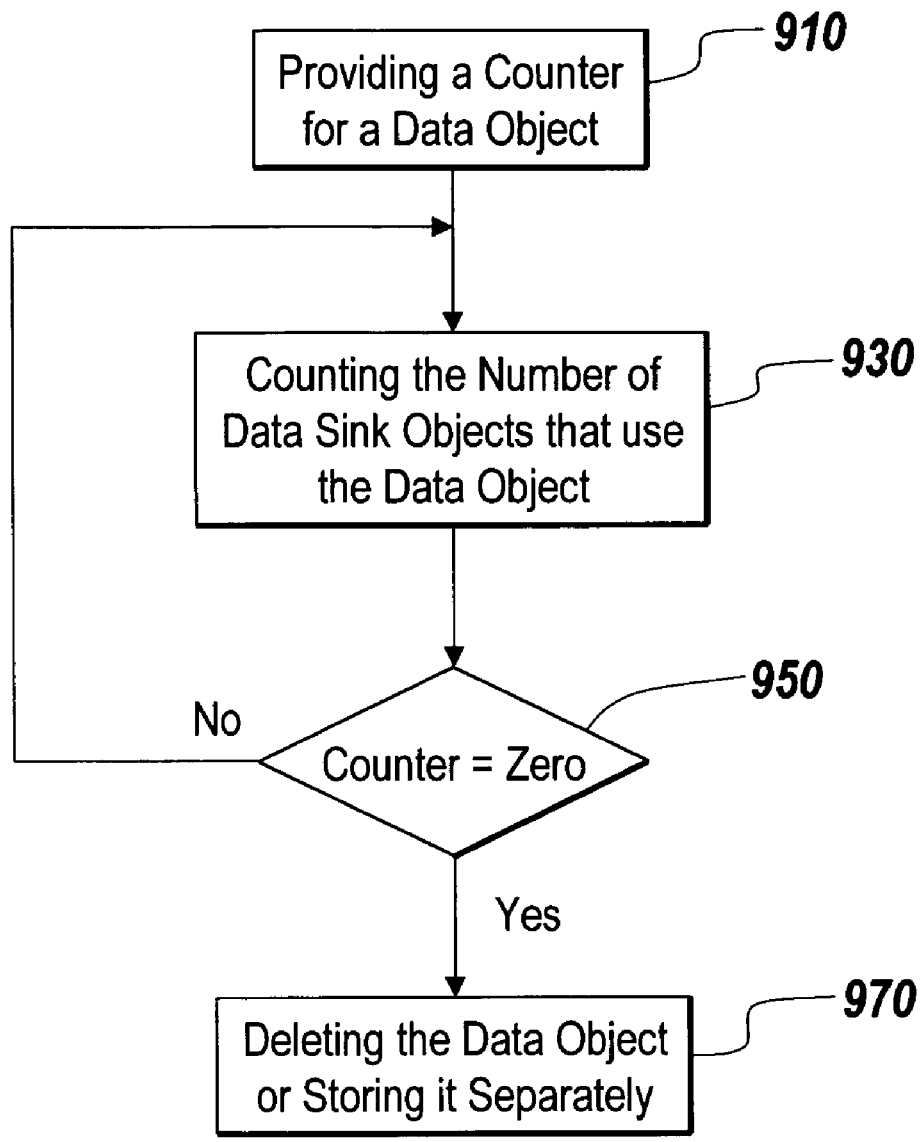
FIG. 9 is a flow chart showing the exemplary operation of the counter of the data object in the illustrative embodiment of the present invention.

FIG. 9 is the flow chart showing the operation of the counter of the data object 540 in the illustrative embodiment of the present invention. The counter is provided for the data object 540 to indicate the number of data sink objects 150-190 that are currently utilizing the data object 540 (step 910). The counter is automatically increased when the identification information of the data object 540, such as the pointer of the data object 540 in the memory of a computer system, is provided to the data sink objects 150-190, and is automatically decreased when each of the data sink objects 150-190 no longer needs to access the data associated with the data object 540 (step 930). If the counter is decreased to zero (step 950), which indicates that the data object 540 is no longer needed by the data sink objects 150-190, the data object 540 is removed from the memory of the computer system (step 970). Alternatively, if the counter is decreased to zero, the data object 540 is stored in a separate location of the memory for a future use (step 970).

Figure 9A:
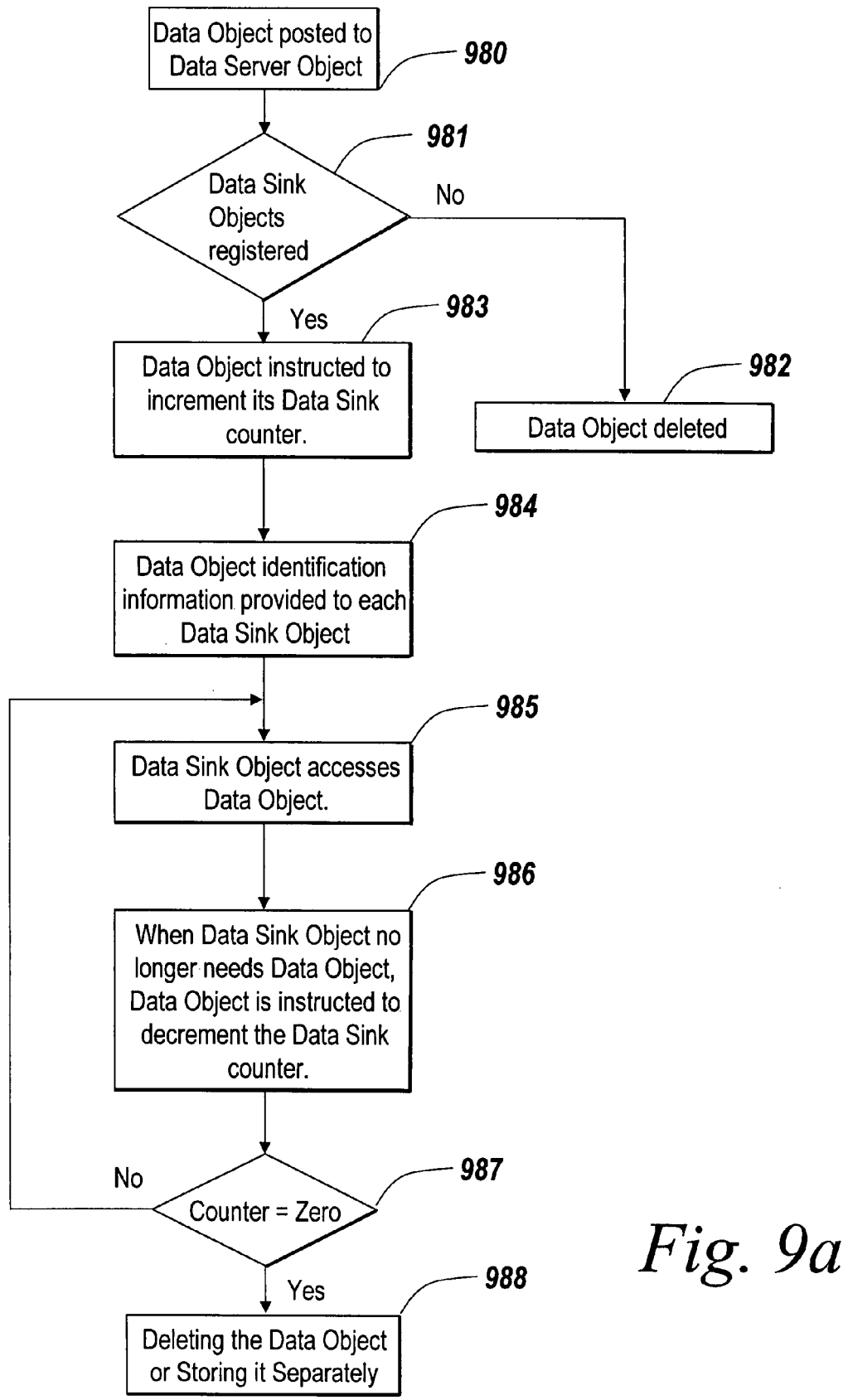
FIG. 9a is a flow chart showing the operation of the illustrative embodiment of the present invention in connection with the data sink counter of the data object 540 described in FIG. 9.

FIG. 9*a* is the flow chart showing the operation of the illustrative embodiment of the present invention in connection with the data sink counter of the data object 540 described in FIG. 9. When a data object is created by a data object creator (FrameKit), the data object is posted to a data server object (step 980). If no data sink object is registered with the data server object (step 981), the data object is deleted (step 982). If data sink objects are registered with the data server object (step 981), the data object is instructed to increment its data sink counter (step 983). Information identifying the data object, such as the pointer of the data object in a memory, is provided to each of the data sink objects (step 984). Each of the data sink objects accesses the data object using the identification information of the data object (step 985). When a data sink object no longer needs to access the data object, the data object is instructed to decrement the data sink counter (step 986). If the counter is decreased to zero (step 987), the data object is removed from the memory of the computer system or alternatively, the data object is stored in a separate location of the memory (step 988).

In summary, the data acquired from a data source is encapsulated into a data object, which is subsequently posted to a data server object with the pointer information of the data object in the memory of a computer system. The data server object shares the pointer information of the data object with the data sink objects that are registered with the data server object. The data object shared by the multiple data sink objects prevents extraneous copies of the acquired data provided to each of the data sink objects. The data object is provided with a counter indicating the number of data sink objects that use the data object. The data transfer systems of the present invention remove the data object if the counter indicates that the data object is no longer used by the data sink objects. As a result, the present invention efficiently uses the memory space of the computer system.

It is apparent that there has been provided, in accordance with the present invention, object-oriented data transfer methods and systems. While this invention has been described in conjunction with illustrative embodiments thereof, it is evident that many alternatives, modifications, and variations will be apparent to those skilled in the art. For example, the present invention can be applied to any data transfer system including a data transfer system that transfers data from application software tools of computer systems to devices coupled to the computer systems. Accordingly, it is intended to embrace all such alternatives, modifications and variations that fall within the spirit and broad scope of the appended claims.

We claim:

1. A system for transferring data from a data source to multiple data sink objects, the system comprising:
    a data source holding acquired data;
    an interface communicating with the data source to receive the data from the data source;
    a plurality of data sink objects including one or more application software tools or one or more output devices;
    a processor controlling a data processor that encapsulates the received data into a data object;
    one or more memory storages storing the data object along with a data object pointer and a data server object, the data object pointer indicating a location of the data object in the one or more memory storages to identify the data object;
    the data processor posting the data object along with the data object pointer to the data server object, and registering one or more of the plurality of data sink objects with the data server object;
    the data server object transferring the data object pointer to the one or more registered data sink objects, the one or more registered data sink objects accessing the data object using the data object pointer; and
    the data server object sharing the data object among the one or more registered data sink objects to prevent extraneous copies of the received data from being provided to the one or more registered data sink objects.

2. The system of claim 1 wherein the data server object includes a list listing the one or more registered data sink objects that are registered with the data server object.

3. The system of claim 1 wherein the system provides a technical computing environment.

4. The system of claim 1 further comprising at least one data listener object that is registered to a respective one of the one or more registered data sink objects.

5. The system of claim 4, wherein the respective one of the one or more registered data sink objects deletes each of the at least one data listener object registered with the respective one of the one or more registered data sink objects when the respective one of the one or more registered data sink objects is deleted.

6. The system of claim 4, wherein the respective one of the one or more registered data sink objects notifies each of the at least one data listener object registered with the respective one of the one or more registered data sink objects when the respective one of the one or more registered data sink objects is deleted.

7. The system of claim 4, wherein the respective one of the one or more registered data sink objects notifies each of the at least one data listener object when the respective one of the one or more registered data sink objects is updated with a new data object.

8. The system of claim 1 wherein the data source provides data sequence continuously for a period of time.

9. The system of claim 1 wherein the data source provides a package of data, the package of data being used independently of other packages of data.

10. The system of claim 9 wherein the package of data includes a frame of image data.

11. The system of claim 9 wherein the package of data includes a scan of radar data, sensor data, audio data, or network data packets.

12. The system of claim 1 wherein the data processor configures a maximum amount of memory that all data objects use at a given instance of time.

13. The system of claim 1, wherein the processor is 64 bits or more.

14. A non-transitory computer readable medium holding instructions executable in a computer system, wherein the computer system receives data from a data source and transfers the data to data sink objects, the medium holding:
    one or more instructions for communicating with the data source to receive the data from the data source;
    one or more instructions for encapsulating the data into a data object; one or more instructions for storing the data object along with a data object pointer and a data server object in a memory, the data object pointer indicating a location of the data object in the memory to identify the data object;
    one or more instructions for posting the data object along with a data object pointer to the data server object;
    one or more instructions for registering the data sink objects with the data server object, the data sink objects including one or more application software tools or one or more output devices;
    one or more instructions for the data server object transferring to the registered data sink objects the data object pointer, the registered data sink objects accessing the data object using the data object pointer; and one or more instructions for the data server object sharing the data object among the registered data sink objects to prevent extraneous copies of the data from being provided to the registered data sink objects.

15. The medium of claim 14 further comprising a data sink listener object that is registered with one or more of the registered data sink objects.

16. The medium of claim 15 wherein the data sink listener object performs a task relating to a function of a respective one of the registered data sink objects.

17. The medium of claim 15 wherein the data sink listener object performs a task relating to a function of a respective one of the registered data sink objects on a thread of the data server object.

18. The medium of claim 15 wherein the data sink listener object performs a task relating to a function of a respective one of the registered data sink objects on a thread different from that of the data server object.

19. The medium of claim 14 wherein the computer system provides a technical computing environment.

20. The medium of claim 14 wherein at least one of the registered data sink objects performs a function on a thread of the data server object.

21. The medium of claim 14 wherein at least one of the registered data sink objects performs a function on a thread different from that of the data server object.

22. The medium of claim 14 wherein the instructions are originated from code written with C programming language.

23. The medium of claim 14 wherein the instructions are originated from code written with an object-oriented programming language, the object-oriented programming language comprising one or more of C++ and C#.

* * * * *